United States Patent

[11] 3,601,791

| [72] | Inventor | Kenneth C. Emerson<br>Cedar Rapids, Iowa |
|---|---|---|
| [21] | Appl. No. | 824,807 |
| [22] | Filed | May 15, 1969 |
| [45] | Patented | Aug. 24, 1971 |
| [73] | Assignee | Collins Radio Company<br>Cedar Rapids, Iowa |

[54] VEHICLE STATION KEEPING DISPLAY APPARATUS
7 Claims, 13 Drawing Figs.

[52] U.S. Cl. .................................................... 340/27 NA
[51] Int. Cl. .................................................... G01c 23/00
[50] Field of Search .......................................... 340/23, 24,
25, 27 NA; 343/112 PT

[56] References Cited
UNITED STATES PATENTS
3,059,233 10/1962 Guarino et al. ................ 343/112 PT

*Primary Examiner*—T. H. Tubbesing
*Attorneys*—Richard W. Anderson and Robert J. Crawford

ABSTRACT: A rho-theta relative position indicator for displaying separation and bearing with respect to a reference vehicle. From radar input parameters, the bearing of a lead or target vehicle is displayed as a pointer indication and separation is presented by the displacement of a second indicator along the bearing pointer axis, the combined display presenting location information for vehicle station keeping purposes.

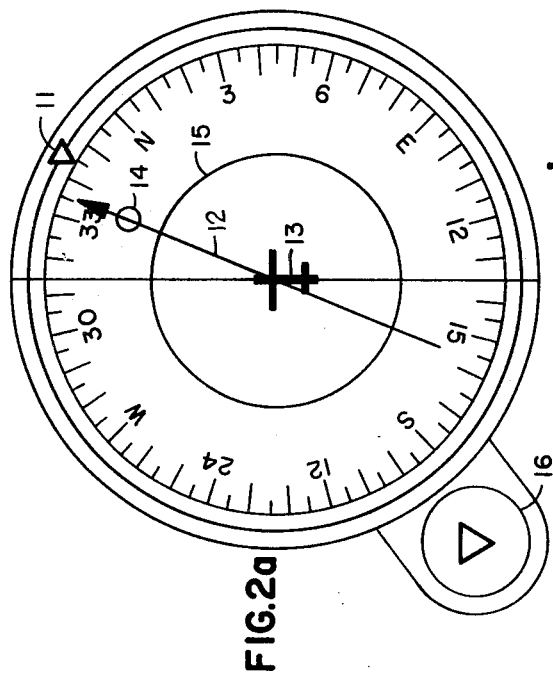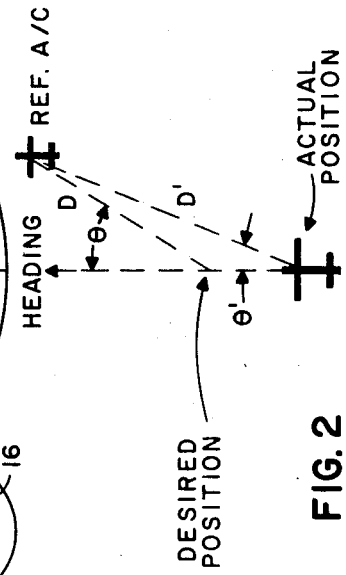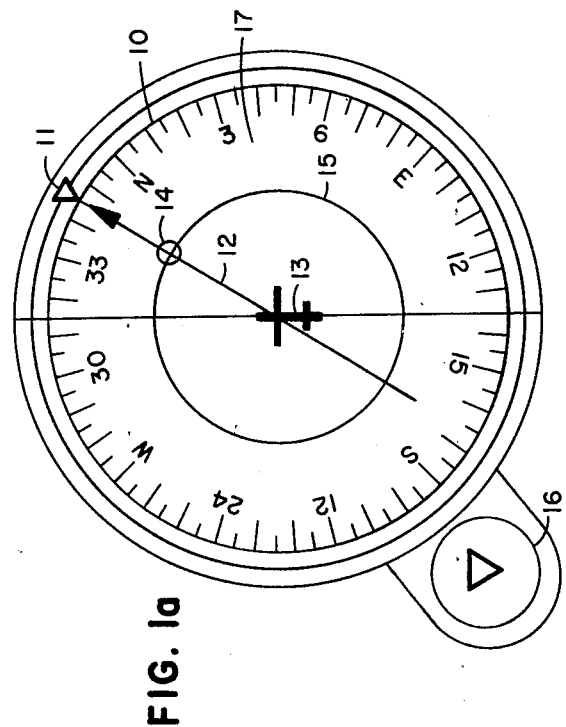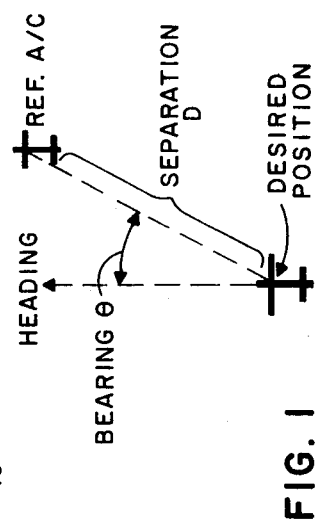
FIG. 2a
FIG. 2
FIG. 1a
FIG. 1
INVENTOR.
KENNETH C. EMERSON
BY R.W. Anderson
AGENT

INVENTOR.
KENNETH C. EMERSON

BY *R. W. Anderson*

AGENT

INVENTOR.
KENNETH C. EMERSON

VEHICLE STATION KEEPING DISPLAY APPARATUS

This invention relates generally to formation station keeping and more particularly to an instrument for presenting an indication of the geographical relation ship of a first vehicle with respect to a second vehicle. More particularly, the present invention relates to the art of station keeping as concerns vehicles. The invention will be described with respect to a particular usage as a station keeping aid for an aircraft to maintain a position in formation flying relative to another aircraft in the formation. The invention is not to be limited to this particular usage in that it might be equally usable in a number of situations wherein a number of vehicles or other types of objects were to be maintained in a particular formation.

The primary object of the present invention is provision of a pictorial representation of a formation situation wherein the observer is presented with a maplike picture of his location with respect to a lead or target vehicle upon which he is engaged in station keeping. For example, for a given formation the observer may be required to maintain a given distance separation between his vehicle and a reference vehicle and continuously maintain a predetermined bearing between the reference vehicle and his vehicle.

The invention is featured in the provision of an instrument which accepts radar distance and bearing information as input parameters and presents the relationship between the observer's craft and a reference craft as to distance and bearing, discrepancies between which may be readily corrected.

These and other features and objects of the present invention will become apparent upon reading the following description in conjunction with the accompanying drawings in which:

FIGS. 1 through 5 depict a plurality of station keeping situations along with corresponding display of the situation on an instrument in accordance with the present invention;

Figure 4A:
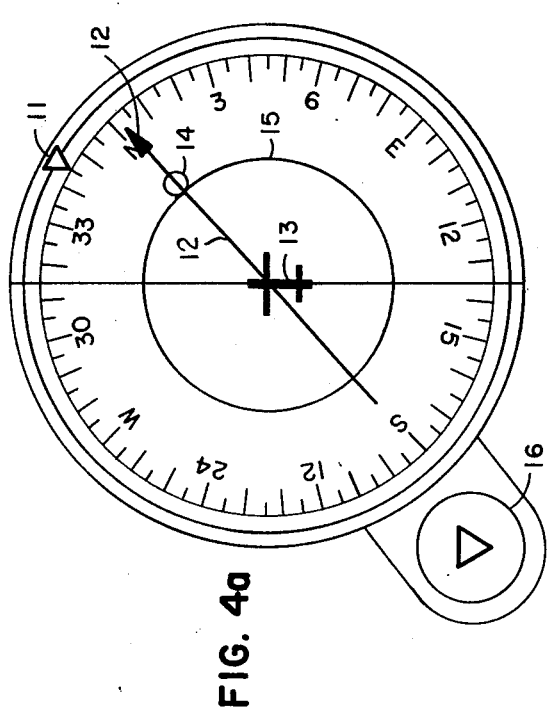

The present invention receives information defining the position of a reference or target vehicle in the form of rhotheta information from a vehicle carried radar. The bearing between the reference and the operator's vehicle is a first input while the separation distance between the operator'vehicle and the reference vehicle is the second input. The invention provides means for incorporating this rhotheta input information into a situation display to present to the observer a true inside-out display wherein the observer's position is fixed and distance and bearing with respect to the reference vehicle displayed with respect to the observer's position.

With reference of FIG. 1, a station keeping situation between the observer's aircraft and a reference aircraft as would occur in formation flying is presented. The bearing is indicated as the angle between the heading of the aircraft and the location of the reference aircraft and the separation is indicated as the distance D between the observer's aircraft and the reference aircraft. FIG. 1 indicates the flight situation where the observer is located in a desired position for station keeping; that is, he is maintaining a desired bearing θ between his aircraft and the reference aircraft and is maintaining a desired separation D with respect to the reference aircraft.

FIG. 1a illustrates the corresponding situation of an instrument as it is displayed to present to the observer. The instrument comprises a transparent front face member 17 upon which is etched, or otherwise fixed, an index marker 13—in this instance a graphic symbol of the observer's aircraft. A heading azimuth ring 10 is continuously positioned in accordance with the instantaneous heading of the aircraft. The incorporation of the heading azimuth ring permits displaying the rhotheta station keeping information relative to aircraft heading. A desired bearing to the reference aircraft or vehicle is set into the instrument by the observer by means of a knob 16 which rotates an index member 11 with respect to the heading azimuth scale so that any selected bearing angle θ may be set into the display.

As will be further described in detail, the desired bearing as set in one the index marker 11 may also be positioned in accordance with changes in aircraft heading; that is, the market 11 rotates with the azimuth ring 10 upon changes in heading but maintains its preselected relative position with respect to the azimuth ring 10.

The actual bearing between the reference aircraft and the observer's aircraft is displayed by means of a rotating pointer 12 which rotates about an axis of rotation passing through reference aircraft symbol 13. The distance separation D between the observer's aircraft and the reference aircraft is displayed by a circular marker 14 which is caused to be displaced along the axis of the baring pointer 12 by an amount proportional to the measured separation distance. The face plate 17 may additionally carry a circular reference index 15 corresponding to a desired distance separation to be maintained. Station keeping is effected by maintaining a position with respect to the reference aircraft such that the position indicator 14 is displaced over the distance reference circle 15 and the actual bearing pointer 12 is aligned with the desired bearing reference index 11.

FIG. 2 illustrates a flight situation where the actual position of the aircraft is behind the desired position such that a bearing $θ'$ and separation distance $D'$ are being experienced rather than the desired rhotheta relationship. With this position error, the corresponding display on the instrument of FIG. 2a indicates that the displacement indicator 14 is displaced beyond the desired displacement reference circle 15 to indicate that the separation is too great and the bearing pointer is no longer aligned with the bearing reference index 11, indicating that the actual bearing is less than the desired. The display thus suggests to the pilot that he pull ahead to decrease his separation distance. In doing so, the relative bearing with respect to the reference aircraft comes into alignment.

Figure 3A:
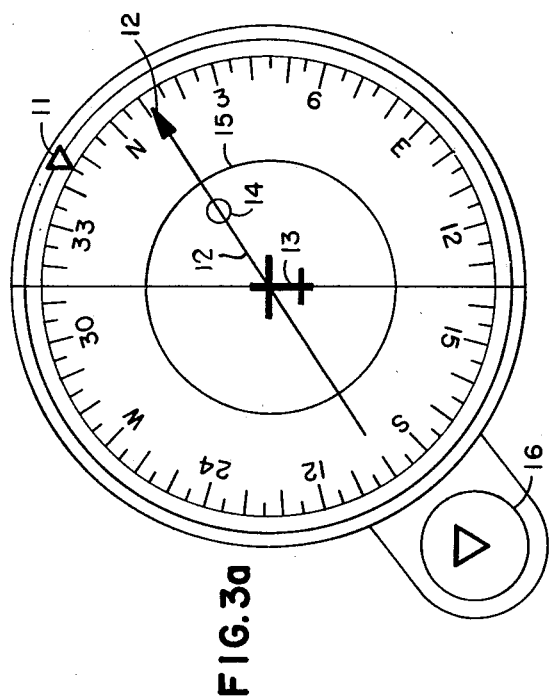
Figure 3:
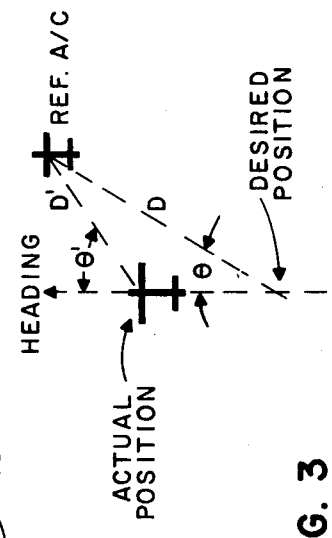

FIG. 3 depicts an actual aircraft position ahead of the desired position such that the actual separation distance $D'$ and bearing $θ'$ do not coincide with the desired parameters θ and D. In this instance, the distance is less than the desired while the angle is greater. FIG. 3a illustrates the corresponding displayed situation. The indicator 14 reads less separation than desired and the actual bearing indicated by pointer 12 is greater than the desired as set by the reference 11. In this instance the instinctive command is to "back up" so as to increase the distance and decrease the bearing.

Each of the situations of FIGS. 2 and 3 have a common command "sense"—as though the actual separation as depicted by the position index 14 were a pivot point for the bearing pointer 12 and that the command is to swing the tail end of the bearing pointer 12 by moving the observer's aircraft so as to pivot the arrow head of pointer 12 in the direction of the desired bearing index 11.

Figure 4:
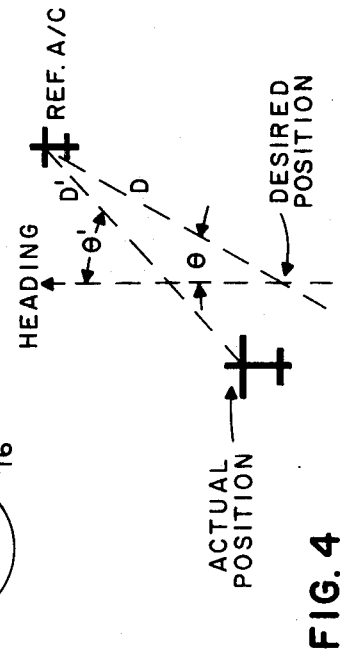
Figure 5A:
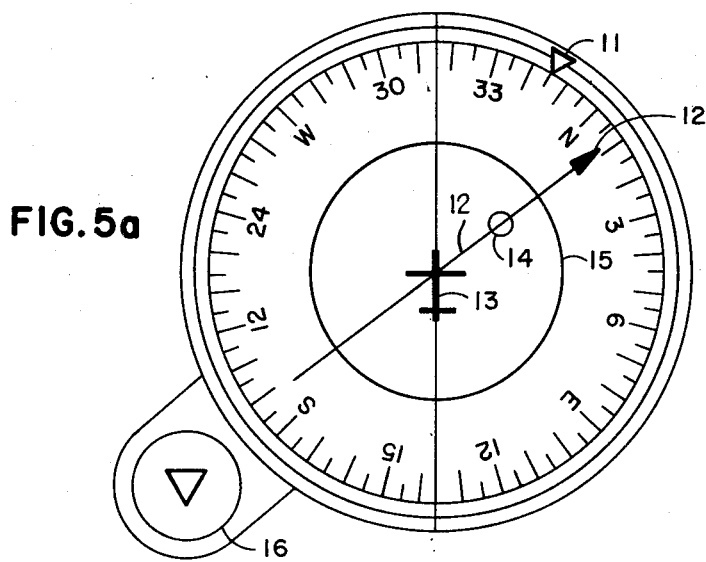
Figure 5:
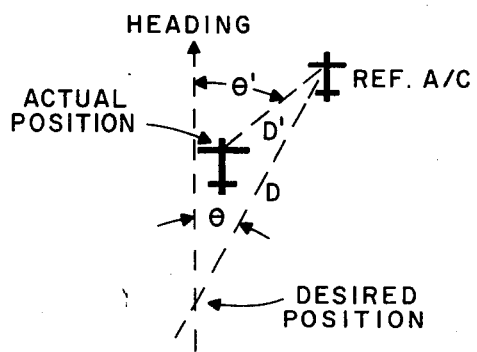

FIGS. 4 and 5 illustrate respective situations where the actual bearing is to the left and to the right of the desired position, and the observer is ahead of his desired position. T)E FIG. 4 situation shows actual distance greater and actual bearing greater than the desired. The command is to back off slightly but mainly to swing around more directly behind the reference aircraft. Note that the distance as displayed in FIG. 4a indicates a separation only slightly exceeding the desired while a considerable bearing area is depicted.

The flight situation of FIG. 5 shows the observer's aircraft ahead and to the right of the desired position, resulting in a smaller distance separation than desired and greater bearing angle than desired. The corresponding display of FIG. 5a shows actual bearing angle shown by the pointer exceeding the selected bearing and a separation distance less than desired. In this instance the command is to back off primarily to align the bearing pointer with the bearing reference index 11 while increasing the separation distance.

Figure 6:
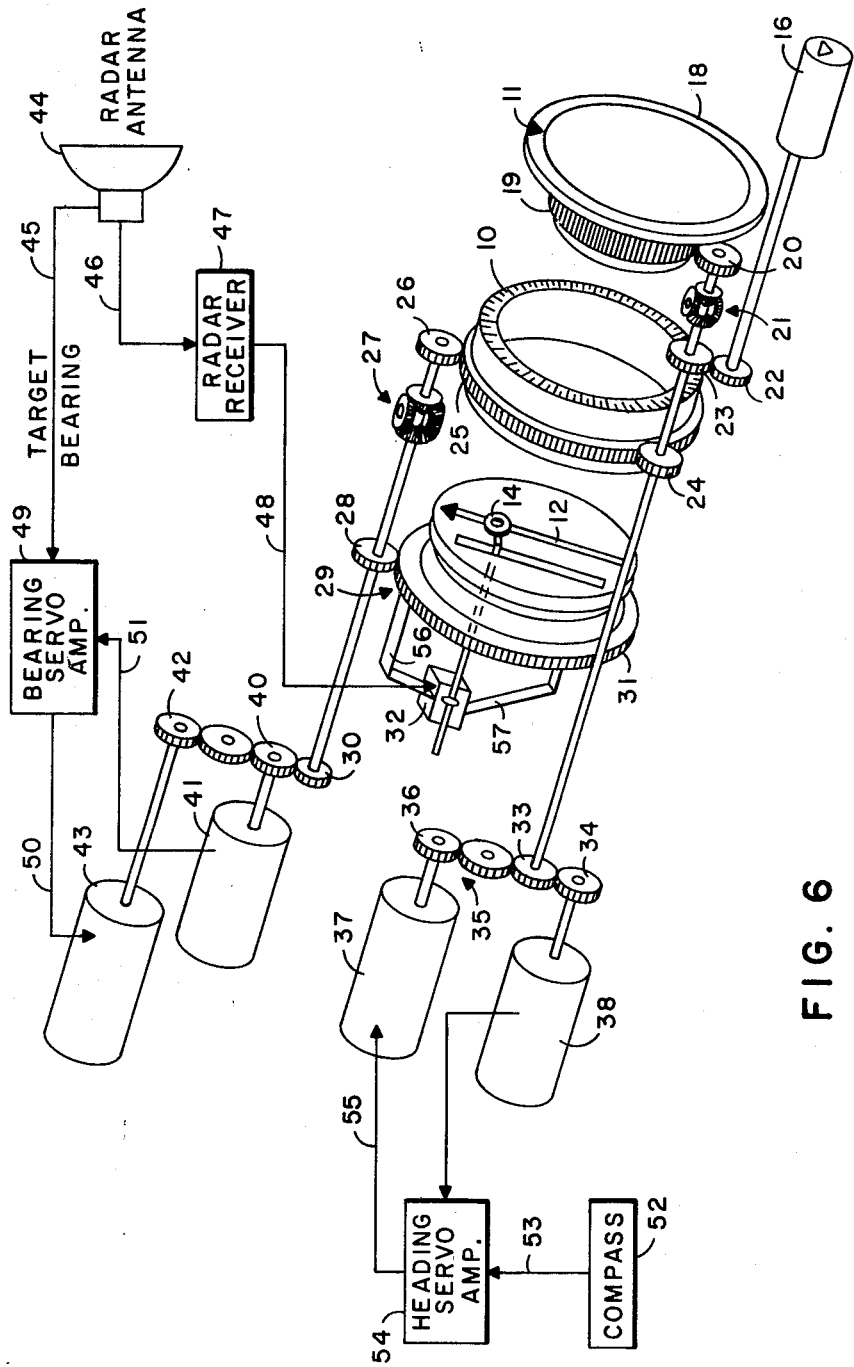
FIG. 6 is a functional diagram of a system for station keeping in accordance with the present invention.

An instrument assembly present input parameter system is shown functionally in FIG. 6. Three main assemblies are incorporated to embody the indication. The selected bearing index 11 is affixed to an annular member 18. The heading azimuth card 10 is placed on a ring member as well. The bearing indicator 14 and separation distance indicator comprise a third main assembly. The three main assemblies are indicated in their relative exploded positions for clarity, it being realized that an assembled instrument would place these three main assemblies in overlapping and appropriate concentric positions to present the composite display.

The ring member 18 carrying the selected bearing index 11 may be formed with a ring gear 19 driven by the output gear 20 of a first mechanical differential 21. A first input to the mechanical differential 21 through gear train 22-23 is a rotation impart by a bearing select knob 16 which is accessible on the front panel of the instrument and which may be rotated to position the selected bearing index 11 as desired. A second input to mechanical differential 21 is imparted through a shaft driven by gear 33 which in turn in positioned in accordance with aircraft heading. Thus, the front ring member 18 carrying the selected bearing reference index 11 rotates continuously with changes in aircraft heading and may additionally be rotated relative to aircraft heading by a selective mechanical input on the part of the operator by means of selector knob 16.

The heading azimuth card 10 is carried on a ringlike member formed with a ring gear 25 which is seen to be driven by a gear 24 in the heading drive gear train such that the heading azimuth card 10 is continuously positioned in accordance with the rotation of the heading servomotor 37. Rotation of the heading motor 37 then simultaneously rotates the heading azimuth card 10 and the ring member 18 carrying the selected bearing reference index 11 while the relative angular position between the ring 18 and the heading azimuth card 10 may be selectively adjusted by means of the bearing select knob 16.

The third assembly includes the bearing pointer 12 and the separation distance indicator 14. This assembly might comprise a ringlike structure including a ring gear 31 driven by a drive gear 28 which is rotated through an input gear 30 and gear trains 40-42 in accordance with the rotation of a bearing servomotor 43. As will be further described, the bearing servomotor 43 rotates in accordance with changes in the measured relative bearing between the reference vehicle and the observer's vehicle. Thus, the bearing pointer 14 is positioned angularly in accordance with the measured bearing; that is, the actual bearing. The assembly carrying the bearing pointer 12 also carries, by means of appropriate mounting arms 56-57, a meter movement 32 which is energized in accordance with an input 48 which is proportional to the measured distance between the observer's aircraft and the reference vehicle. THus, the pointer 12 and the distance indicator 14 rotate with changes in actual bearing. The assembly carrying the bearing pointer 12 and the separation distance indicator 14 is rotated with changes in aircraft heading as well as the measured bearing with respect to the reference aircraft. For this purpose a second mechanical differential 27 is incorporated, the first input to which is proportional to aircraft heading through the drive from the heading servomotor gear train through the ring gear 25 and input gear 26.

The second input to the mechanical differential 27 is the actual measured bearing from the bearing servomotor gear drive. Thus, the ring assembly carrying the bearing pointer 12 and the separation distance indicator 14 is continuously rotated as a function of aircraft heading as well as the actual measured bearing.

Input parameters to drive the indicia of the instrument are derived from a compass and from a radar carried by the observer's vehicle. A compass 52 may supply a signal 53 to heading servo amplifier 54. The heading servo amplifier develops an output 55 to drive the heading servomotor 37. This servo loop is completed by the inclusion of a heading synchro 38 which is driven by rotation of the motor 37 through a gear train 35 including gears 36, 33, and 34 to supply a position feedback signal to the heading servo amplifier 54.

A radar including antenna 44 might develop a first output 45 indicative of the bearing of the target. The bearing information is supplied to a bearing servo amplifier 49 which develops an output 50 to drive the bearing servomotor 43. A position feedback synchro 41 is driven upon rotation of the bearing servomotor 43 to provide a feedback signal 51 to the bearing servo amplifier 49 and close the loop.

Radar distance information is derived from radar receiving means 47 which receives an input signal 46 from the antenna 44 and develops a distance output 48 which is supplied to the meter movement 32 in the instrument to displace the distance separation indicator 14 along the axis of the bearing pointer 12 as a function of separation distance.

The basic display elements lend themselves to alternative driving arrangements as may be desired for particular usages.

Figure 7:
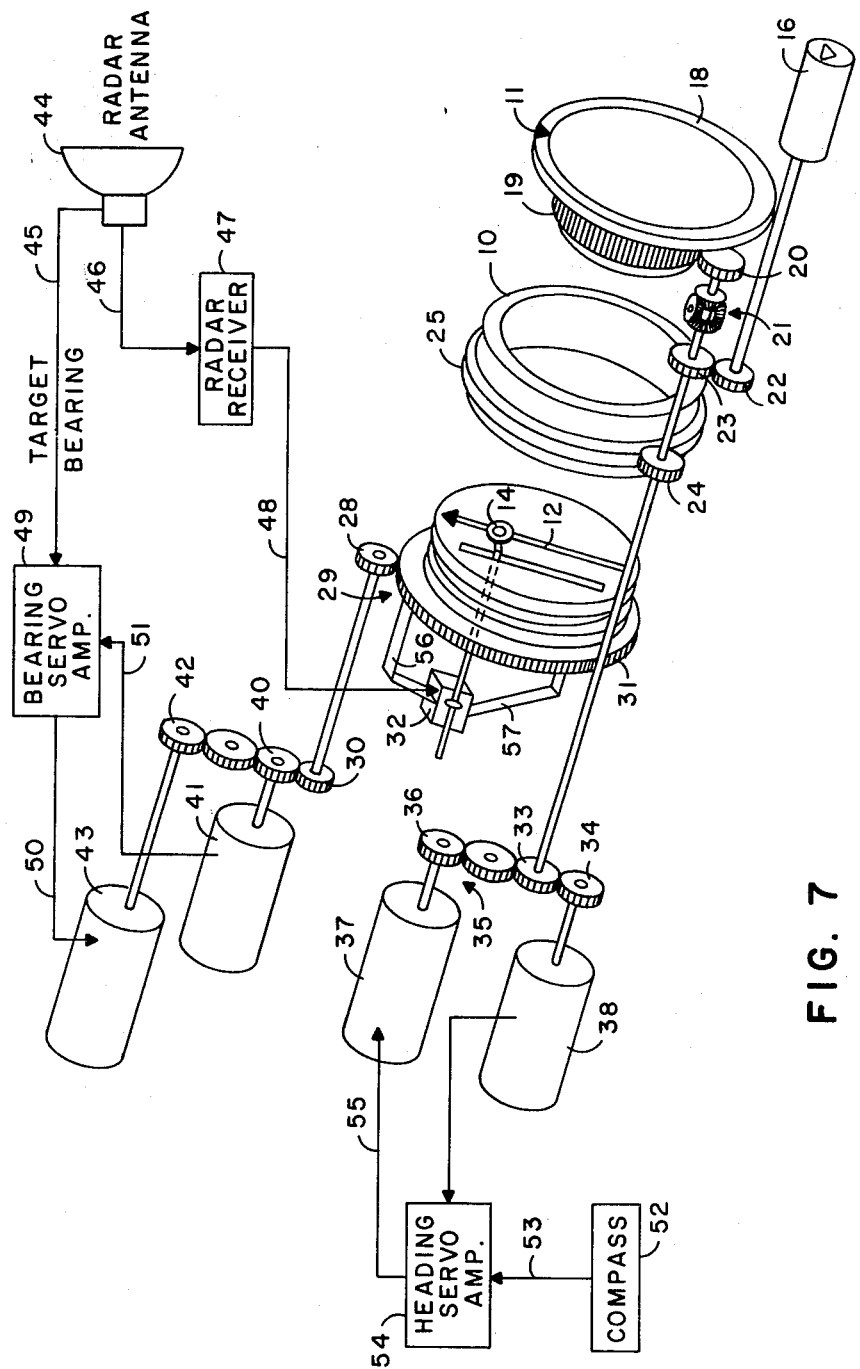
FIGS. 7 and 8 are functional diagrams of modifications of the system of FIG. 6.

FIG. 7 illustrates a modification of the system of FIG. 6 wherein the selected bearing index 11 retains both heading and operator selected inputs while the bearing pointer 12 is positioned only in accordance with the radar bearing servo loop. This system eliminates the mechanical differential 27 and its input drive gear 26.

Figure 8:
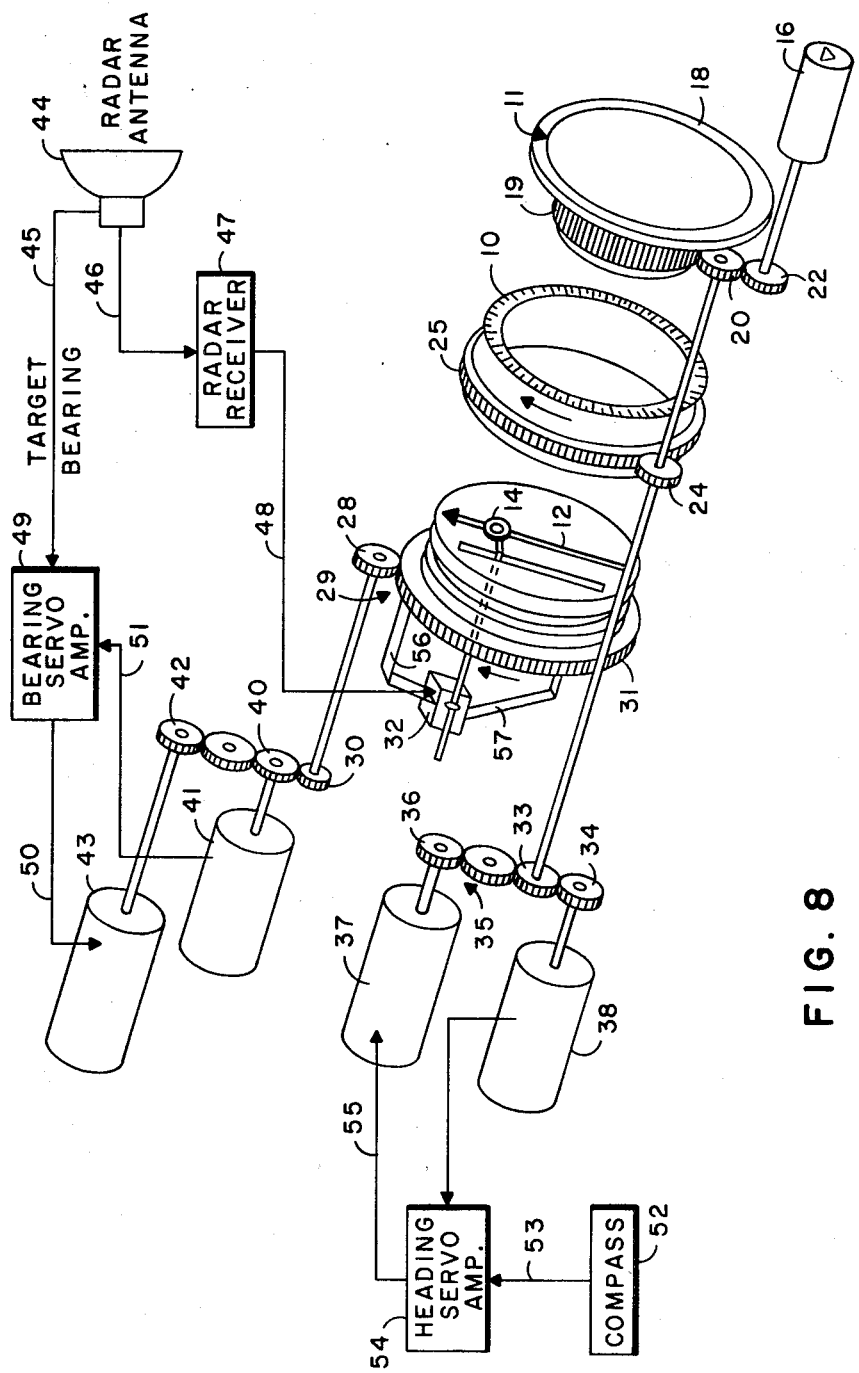

FIG. 8 illustrates a further modification wherein heading input is removed from both the selected bearing index 11 and the bearing pointer 12. Neither differential is included in this embodiment with each of the members being driven directly on a relative basis with respect to the instrument lubber line.

Although the present invention has been described with respect to particular embodiments thereof, it is not to be so limited as changes might be made therein which fall within the scope of the invention as defined in the appended claims.

1. A station keeping instrument display comprising a first reference index fixed to the face of said instrument and representative of the observer's position, a first pointerlike indicator lying in a plane parallel to that of the face of the instrument and rotatable about an axis coincident with said first reference index, an annular scale disposed symmetrically about the rotation axis of said first indicator, a second reference index disposed adjacent said annular scale, means for selectively positioning said second index with respect to said annular scale, a second indicator comprising an element displaceable along the axis of said first indicator, first positioning means rotating said first indicator as a function of the relative bearing between the observer's position and a reference position, second positioning means displacing said second indicator as a function of the separation between the observer's position and that of said reference position, fixed index means comprising a circle of predetermined diameter place concentrically about the rotation axis of said first indicator, and the diameter of said circle corresponding to a predetermined distance separation between said observer and reference positions.

2. An instrument as defined in claim 1 wherein said second indicator element comprises an annular ring symmetrically disposed with respect to said first indicator.

3. An instrument as defined in claim 2 wherein said first positioning means comprises a servo positioning system responsive to the bearing determining means of a radar means oriented at said observer's position, said second positioning means comprising a meter movement the body of which is mounted for rotation with said first indicator and comprising an arm member affixed to said second indicator, said meter receiving an input signal proportional to the separation between said observer's and reference positions as developed by said radar means, said arm member being deflected by said meter movement in a plane coincident with the longitudinal axis of said second indicator and substantially normal to the face plane of said instrument.

4. An instrument as defined in claim 3 further comprising means to rotate said annular scale as a function of the heading of a craft defining said observer's position, first and second mechanical differential means the respective outputs of which position said first indicator and said second reference index, a first input to each of said differential means comprising a rotational input proportional to the heading of said craft, the second input to said first differential means comprising the output from said first positioning means and the second input to said second differential comprising a predetermined rotational input selected by said observer.

5. An instrument as defined in claim 3 further comprising means to rotate said annular scale as a function of the heading of a craft defining said observer's position, a mechanical differential means the output of which positions said second reference index, a first input to said differential means comprising a rotational input proportional to the heading of said craft, the second input to said differential means comprising a predetermined rotational input selected by said observer.

6. An instrument as defined in claim 1 further comprising means to rotate said annular scale as a function of the heading of a craft defining said observer's position, first and second mechanical differential means the respective outputs of which position said first indicator and said second reference index, a first input to each of said differential means comprising a rotational input proportional to the heading of said craft, the second input to said first differential means comprising the output from said first positioning means and the second input to said second differential comprising a predetermined rotational input selected by said observer.

7. An instrument as defined in claim 1 further comprising means to rotate said annular scale as a function of the heading of a craft defining said observer's position, a mechanical differential means the output of which positions said second reference index, a first input to said differential means comprising a rotational input proportional to the heading of said craft, the second input to said differential means comprising a predetermined rotational input selected by said observer.